June 12, 1923.
H.W. KRANZ ET AL
1,458,138
CLAMP FOR WELDING MACHINE ATTACHMENTS
Filed May 24, 1920
3 Sheets-Sheet 1
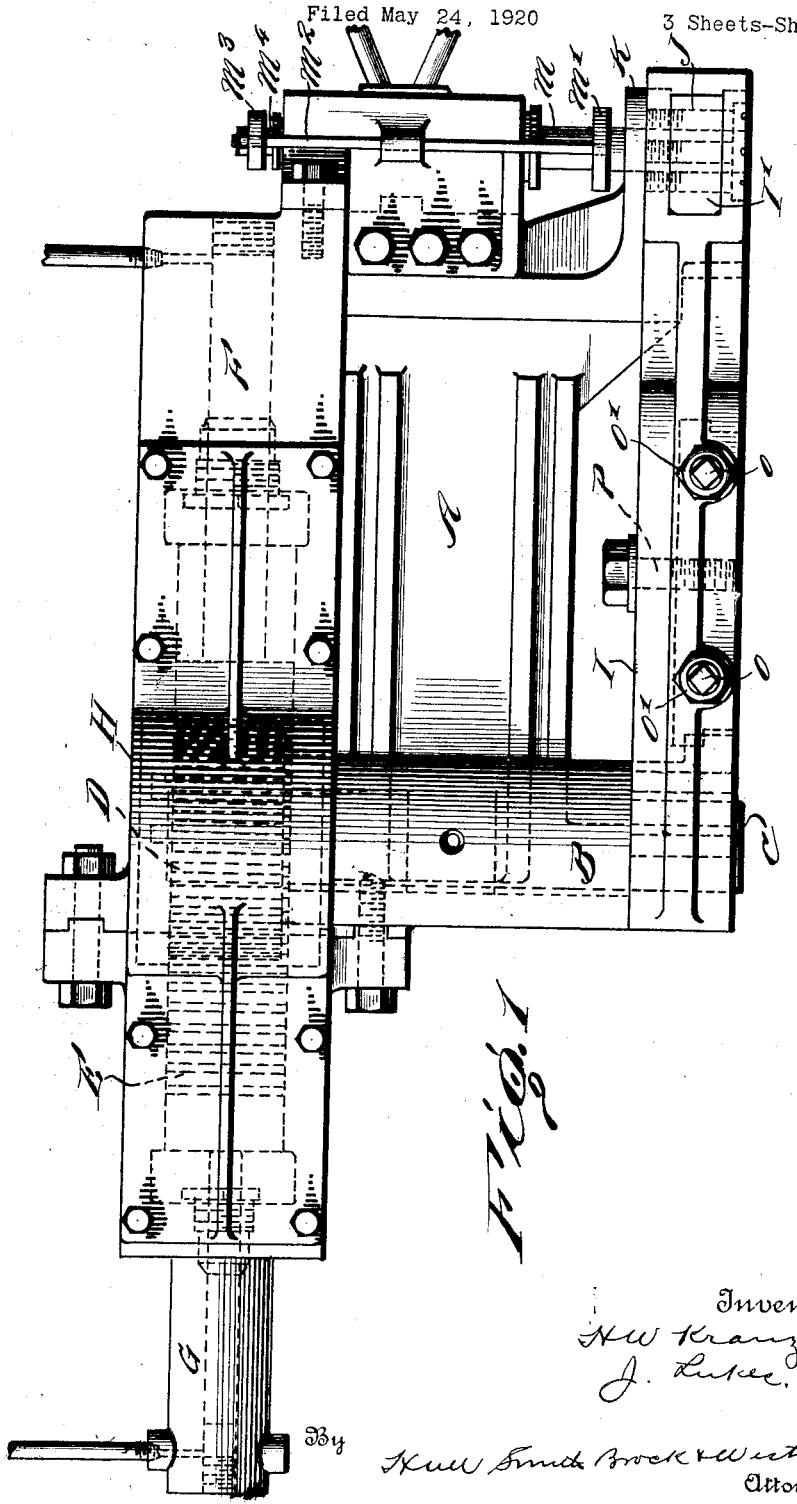

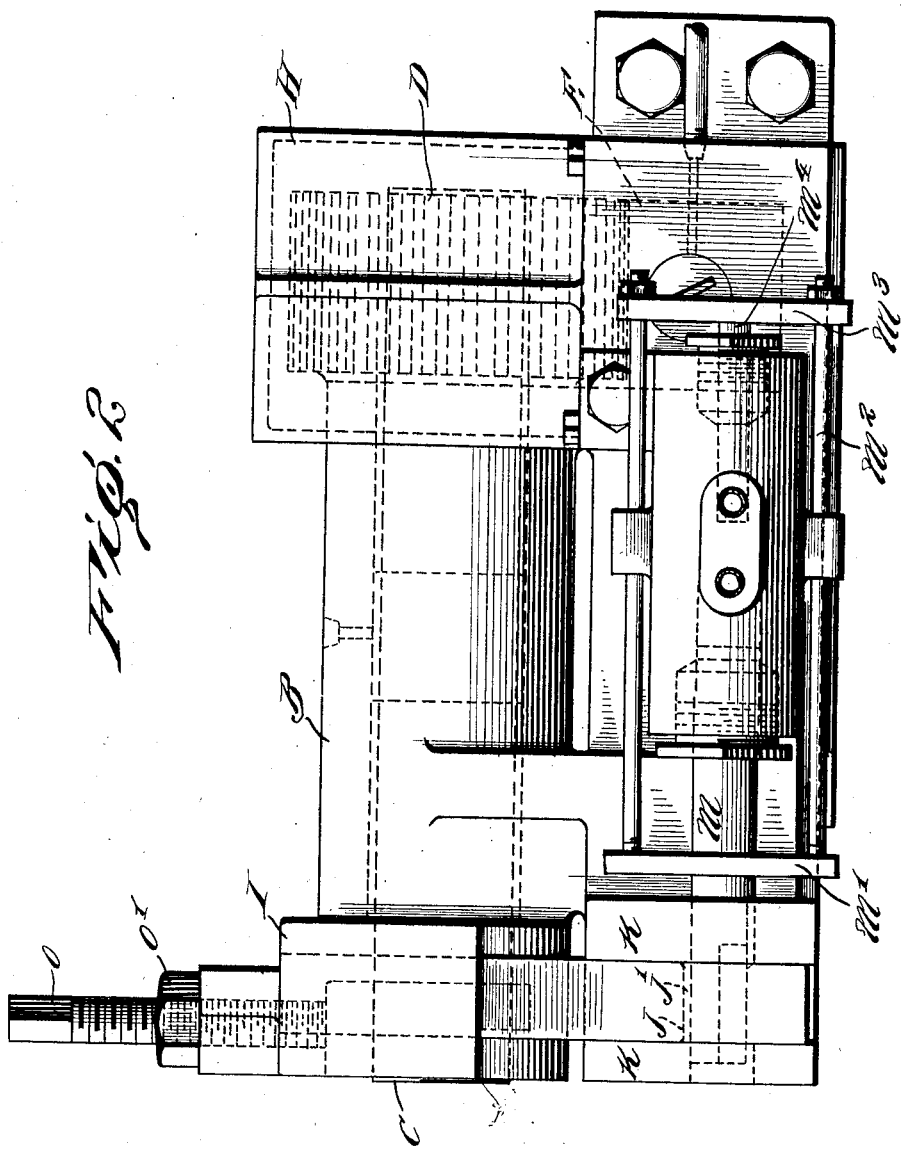

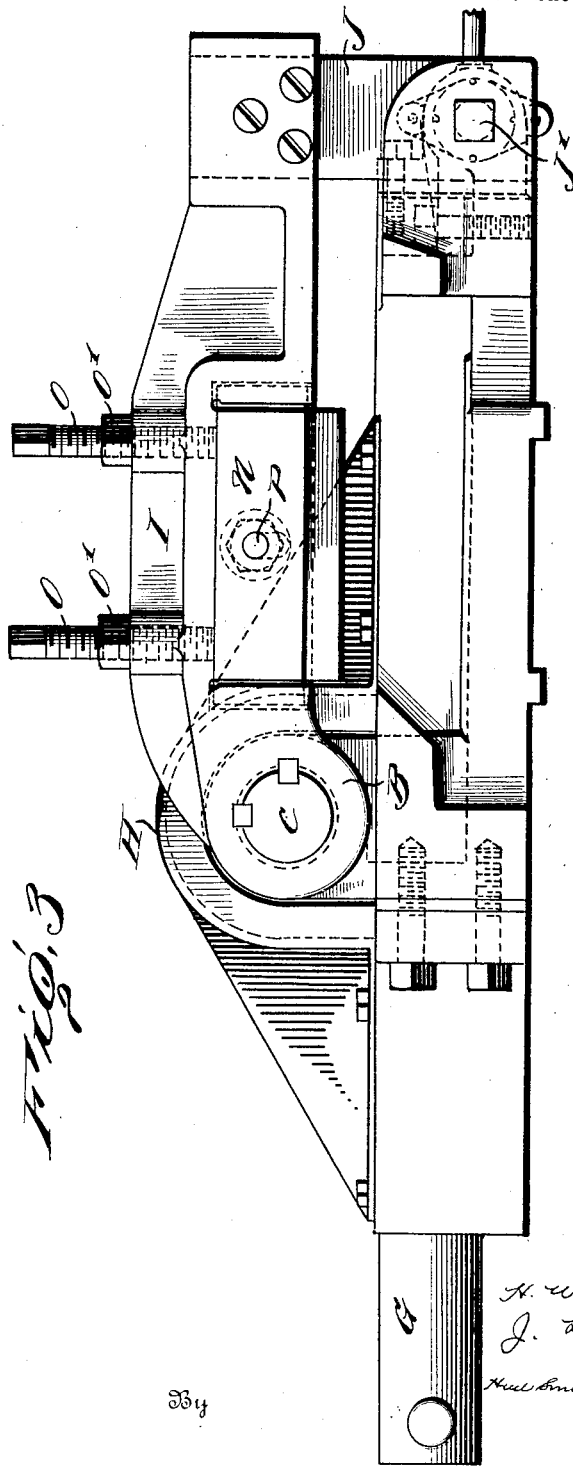

Patented June 12, 1923.

1,458,138

UNITED STATES PATENT OFFICE.

HARRY W. KRANZ AND JOHN LUKES, OF CLEVELAND, OHIO, ASSIGNORS TO THE HYDRAULIC PRESSED STEEL COMPANY, OF CLEVELAND, OHIO, A CORPORATION OF OHIO.

CLAMP FOR WELDING-MACHINE ATTACHMENTS.

Application filed May 24, 1920. Serial No. 383,701.

*To all whom it may concern:*

Be it known that we, HARRY W. KRANZ and JOHN LUKES, citizens of the United States, residing at Cleveland, in the county of Cuyahoga and State of Ohio, have invented a certain new and useful Improvement in Clamps for Welding-Machine Attachments, of which the following is a full, clear, and exact description, reference being had to the accompanying drawings.

This invention relates generally to electric welding machines and more particularly to a clamping device for holding the ends of wheel rims while the electric welding operation is being accomplished. Heretofore it has been usual to clamp the wheel rim to the base by hand-operated devices which require one or two men to secure in place and the same number to remove, which operations require considerable time and it is with the idea of eliminating the manual operations and the saving of time that the present device has been constructed. With this object in view the invention consists in the novel features of construction and in the manner of accompanying or arranging the same, which will be fully described hereinafter and pointed out in the claims.

In the drawings forming a part of this specification Fig. 1 is a top plan view of a clamping device embodying my invention; Fig. 2 is an end view of the same; and Fig. 3 is a side view. In the practical embodiment of my invention, I employ a suitable bedpiece A which can be connected to the base or frame of the electric welding machine in any desired manner. At one end of this bed piece there is arranged a bearing B in which is mounted a shaft C, said shaft having a pinion D upon one end thereof, which pinion is engaged by a reciprocating rack E moved back and forth by means of the hydraulic pistons F and G, respectively. The pinion and rack are enclosed by a suitable housing H. Upon the outer end of the shaft C is an arm I bifurcated at its free end as shown at I' and carrying a plate J which is adapted to pass between keeper members K of the bed plate A. The depending plate J has an opening J' produced therein adapted to receive the bolt L which works through the keeper members K and through the apertured plate J when said plate has been brought down to its final position through the medium of the rack and pinion, shaft and arm, and this bolt L is carried upon the end of a hydraulically operated piston M which is also provided with a yoke M' to which are connected the rods $M^2$ which in turn are connected to a second yoke $M^3$ which is connected with and operated by a pneumatic piston $M^4$ and by proper control of fluid pressure the locking bolt can be moved in the proper direction to either lock or unlock the arm. The arm is caught with a recess on the outer face thereof and in which is arranged an adjustable lock $n$ through which the clamping block (not shown) is connected.

The block N is provided with screws O working through the arm and provided with lock nuts O' by means of which the screws can be locked at any desired point of adjustment and by turning the screws up or down the proper position of the block N can be obtained. A bolt P passes through the arm into the block and an elongated slot permits the definite amount of adjustment with reference to the arm. In operation, the rim to be welded is arranged upon the welding machine base with one end thereof in line with the arm I which is normally held elevated and then by the application of hydraulic pressure this arm is lowered, clamping the rim end in proper position, and the arm so lowered is locked by applying hydraulic pressure to the locking bolt so as to project the same through the keeper members and the depending plate carried by the arm. The parts remain in this position during the welding operation and then by the application of hydraulic pressure the bolt is elevated and the rim can be removed. The other features of the welding apparatus can be of the usual or any preferred construction inasmuch as the present device has reference only to the particular means for clamping the rim end while the welding operation is being accomplished.

Having thus described our invention, what we claim is:—

1. In a device of the kind described, a pneumatically operated oscillating arm adapted to maintain a rim end in proper position while welding, together with fluid operated means for locking said arm in said holding position.

2. In a device of the kind described, the combination with a bed piece, of a vibrating arm arranged thereon, fluid operated means for raising and lowering said arm and fluid operated means for locking said arm in its lowered position.

3. In a device of the kind described, the combination with a bed piece, of a shaft journaled thereon, an arm connected to said shaft, a depending plate carried by said arm, fluid operated means for locking said arm and fluid operated means for engaging said depending plate and locking said arm.

4. In a device of the kind described, the combination with a bed piece, a shaft journaled thereon having an arm at one end and a pinion at the opposite end, a fluid operated rack operating upon said pinion, and a fluid operated bolt operating in conjunction with said arm and bed piece for locking said arm in its lowermost position.

5. In a device of the kind described, the combination with a bed piece, of a shaft journaled thereon, an arm connected to one end of said shaft and a pinion to the opposite end of said shaft, of a rack engaging said pinion and fluid operated means for moving said rack, a depending plate carried by the free end of said arm and adapted to fit between keeper members and a fluid operated bolt adapted to pass through said plate and keeper members.

6. In a device of the kind described the combination with a fluid operated locking arm, an adjustable lock carried by said arm together with fluid operated means for locking said arm in its closed position.

In testimony whereof, we hereunto affix our signatures.

HARRY W. KRANZ.
JOHN LUKES.